US011068978B1

(12) United States Patent
Ferreira

(10) Patent No.: US 11,068,978 B1
(45) Date of Patent: Jul. 20, 2021

(54) DECENTRALIZED SYSTEMS AND METHODS FOR MANAGING LOANS AND SECURITIES

(71) Applicant: Liquid Mortgage Inc., Denver, CO (US)

(72) Inventor: Ian Ferreira, Denver, CO (US)

(73) Assignee: Liquid Mortgage Inc., Denver, CO (US)

( * ) Notice: Subject to any disclaimer, the term of this patent is extended or adjusted under 35 U.S.C. 154(b) by 37 days.

(21) Appl. No.: 16/372,523

(22) Filed: Apr. 2, 2019

Related U.S. Application Data

(60) Provisional application No. 62/651,389, filed on Apr. 2, 2018.

(51) Int. Cl.
| | |
|---|---|
| *G06Q 40/00* | (2012.01) |
| *G06Q 40/02* | (2012.01) |
| *G06Q 20/10* | (2012.01) |
| *G06Q 40/06* | (2012.01) |
| *H04L 9/06* | (2006.01) |

(52) U.S. Cl.
CPC ........... *G06Q 40/025* (2013.01); *G06Q 40/06* (2013.01); *H04L 9/0637* (2013.01); *H04L 2209/38* (2013.01); *H04L 2209/56* (2013.01)

(58) Field of Classification Search
CPC .............................. G06Q 40/25; G06Q 40/06
USPC .......................................................... 705/38
See application file for complete search history.

(56) References Cited

U.S. PATENT DOCUMENTS

| | | | |
|---|---|---|---|
| 9,595,034 B2 | 3/2017 | Rooyen et al. | |
| 2015/0100475 A1* | 4/2015 | Cummings | G06Q 20/108 705/38 |
| 2016/0162897 A1* | 6/2016 | Feeney | G06Q 20/065 705/71 |
| 2016/0260169 A1 | 9/2016 | Arnold et al. | |
| 2016/0342989 A1 | 11/2016 | Davis | |
| 2017/0046651 A1 | 2/2017 | Lin et al. | |
| 2017/0353309 A1* | 12/2017 | Gray | H04L 9/3236 |
| 2018/0241565 A1 | 8/2018 | Paolini-Subramanya et al. | |
| 2018/0253464 A1 | 9/2018 | Kohli et al. | |
| 2018/0260888 A1 | 9/2018 | Paolini-Subramanya et al. | |
| 2018/0260889 A1 | 9/2018 | Paolini-Subramanya et al. | |
| 2018/0276745 A1 | 9/2018 | Paolini-Subramanya et al. | |
| 2018/0285970 A1 | 10/2018 | Snow et al. | |

(Continued)

FOREIGN PATENT DOCUMENTS

WO          2017205902 A1          12/2017

OTHER PUBLICATIONS

Dialog NPL Search Results for U.S. Appl. No. 16/372,523, [Retrieved from Dialog on May 26, 2021] (Year: 2021).*

(Continued)

*Primary Examiner* — Hai Tran
(74) *Attorney, Agent, or Firm* — Zeller IP Group, PLLC; Kyle M. Zeller

(57) ABSTRACT

Methods, systems and apparatuses, including computer programs encoded on computer storage media, are described herein to management transactions relating to loans and securities via a distributed ledger. The platform may allow for authorized users to create, validate, and monitor payments, contractual terms, and lender/borrower obligations, and may permanently record all validated transactions to the distributed ledger.

8 Claims, 14 Drawing Sheets

(56) References Cited

U.S. PATENT DOCUMENTS

2019/0013933 A1* 1/2019 Mercuri ................. G06N 20/00
2019/0028276 A1* 1/2019 Pierce .................... G06Q 20/02
2019/0073729 A1 3/2019 Cheng-Shorland et al.
2019/0087893 A1* 3/2019 Pellew ............... G06Q 20/3825

OTHER PUBLICATIONS

Beth Stetenfeld, "Landing the Right Loan System; Loan Automation Buyer's Guide", Jul. 1992, [Retrieved from Dialog on May 26, 2021] (Year: 1992).*

Samman, G., "Could The 2009 Subprime Mortgage Crisis Have Been Avoided With Blockchain?", Feb. 24, 2016, [Retrieved from the Google Search on May 26, 2021] (Year: 2021).*

Carr et al., Q&A: What might blockchain mean for the mortgage industry?, Jun. 2016, pp. 4, PricewaterhouseCoopers LLP, US.

Sindle et al., Applying blockchain in securitization: opportunities for reinvention, 2017, pp. 40, Structured Finance Industry Group, US.

* cited by examiner

LM Asset Management (9982)

Current Portfolio

| Pool ID 1211 | Issuance Date 1212 | Cur. Notion. 1213 | Issuer 1214 | # Loans 1215 | Actions 1216 |
|---|---|---|---|---|---|
| 1234 | 1/5/2018 | 75,056,002 | Liquid Mortgage | 25,023 | Buy Sell |
| 234567 | 12/15/2017 | 44,364,000 | Liquid Mortgage | 27,468 | Buy Sell |
| 2231 | 11/15/2017 | 15,554,225 | Liquid Mortgage | 23,785 | Buy Sell |

Trade
Selected Pool ID: 234567

Transaction Type: Sell

Original Notional: [ 1222 ]

Offer Price: [ 1223 ]

Options

[ Known ID ]  [ Broad Offer ]  [ BWIC ]

Historical Ownership

Original Notional Outstanding: $450,000,000
Current Notional Outstanding: $399,276,002
Pool Factor: 0.88728

Top Holders

| Investor ID 1261 | % Outstanding 1262 | Org. Notion. 1263 |
|---|---|---|
| c239def82340d9asdr0239sdfa9ds3240923 | 14.4% | $65M |
| f203498ssdqfasdf23423sdfasd00asdhjbno | 11.1% | $50M |
| 037db98glijdniwps929500adjoiuwe900000 | 8.9% | $40M |

Transactions

| Transaction 1271 | Date 1272 | Org. Notion. 1273 | Price 1274 | Buyer 1275 | Seller 1276 |
|---|---|---|---|---|---|
| View | 1/17/18 | $35M | $101.25 | View | View |
| View | 12/31/17 | $57M | $101.50 | View | View |
| View | 12/16/17 | $5M | $100.50 | View | View |

FIG. 12

DECENTRALIZED SYSTEMS AND METHODS FOR MANAGING LOANS AND SECURITIES

CROSS-REFERENCE TO RELATED APPLICATIONS

The present application claims benefit of U.S. provisional patent application Ser. No. 62/651,389, titled "Decentralized Systems and Methods for Managing Securities," filed Apr. 2, 2018, which is incorporated by reference herein in its entirety.

BACKGROUND

This specification relates generally to systems and methods that utilize distributed ledger technology to manage transactions relating to loans and securities among multiple parties.

Residential mortgage-backed securities ("RMBS") refer to a package of financial agreements that typically represent cash yields paid to investors and that are supported by cash payments received from borrowers according to the terms of their mortgages. RMBS are set up to pool cash flow received from individuals and to pay these cash receipts out with waterfall priorities that enable investors to become comfortable with the certainty of receipt of cash at any point in time.

The current RMBS market is controlled by a number of major intermediaries such as the U.S. Government (via Ginnie Mae), government-sponsored enterprises (via Fannie Mae and Freddie Mac), private firms (e.g., investment banks, financial institutions, homebuilders), servicers, trustees, lawyers, and data providers. Unfortunately, these parties have created a centralized market characterized by major inefficiencies and exorbitant fees, unmanaged risk, and privacy concerns.

In a typical RMBS securitization process, once a mortgage is originated by an originator, the loan is registered electronically to record ownership, servicer information, and other relevant data. The loan is then placed into a pool with other mortgages, which may be governed by a trust. The trust defines certain legal rights and obligations of the securitization, and also governs loss structures, cashflow waterfalls, servicer agreements, and other investor rights.

Throughout the life of each individual mortgage, a borrower makes payments directly to a mortgage servicer, who is responsible for payment collection, default mitigation, and loan-level reporting. The servicer then holds these funds for a period of time (e.g., 45 days) prior to remitting the funds to a trustee, who is the administrative agent for the mortgage trust. The trustee distributes funds to a clearing corporation on a monthly basis and payments are remitted to investors, by the clearing corporation, on a delayed timeline. It will be appreciated that each of the above transactions may also require a third-party validator to validate information for both sides of the transaction.

Navigating the complex RMBS securitization process can prove a formidable task, requiring careful management and validation of scheduled payments, contractual terms, and obligations of both the borrower and lender. As such, a number of fees are charged throughout the RMBS securitization process, including securitization origination fees, servicer fees, trustee fees, verification fees and other legal fees. With the exception of origination fees, these fees are ongoing and are charged based on the monthly outstanding loan balance.

Although the goal of creating a mortgage pool is to increase diversification (e.g., by geography and certain borrower characteristics), the diversification effects often diminish as a pool ages. For example, borrowers may prepay or default on a number of loans in a given pool. The aging pool thus becomes levered to the remaining loans, thereby decreasing diversification effects and increasing risks to individual loans.

Finally, loan-level data is typically collected and recorded by the mortgage servicer, with each servicer having its own process and data availability. Unfortunately, data formats are not consistent across servicers and data is often inaccurate or unreliable, creating additional levels of complexity and additional fees to loan and securities investors. Moreover, loan-level servicers often expose a borrower's personally identifiable information ("PII") to various parties without informing the borrower or compensating them in any way.

Accordingly, there remains a need for decentralized systems to increase transparency and lower costs in RMBS and other financial markets through automation of various tasks, while providing a more liquid and diversified solution for market participants. It would be beneficial if such systems could securely track loan-level data and transactions information and store such information in an organized manner. It would be further beneficial if the systems allowed for borrowers to control access to their personal information and compensated borrowers for choosing to disclose their information to another party.

SUMMARY

In accordance with the foregoing objectives and others, exemplary applications, methods and systems are disclosed herein to manage transactions relating to loans and securities among a plurality of parties. The disclosed embodiments utilize distributed ledger technology to facilitate origination, payments, disbursements, transfer, validation, distribution, recordation and other transactions relating to loans (e.g., mortgages) and securities (e.g., RMBS). The embodiments may provide comprehensive, permanent records of all validated transactions, and may make such information available to relevant, authorized parties.

In one embodiment a method is provided. The method may include receiving loan information associated with a loan relating to a lender and a borrower. Generally, the loan information may include a total principal amount, a lender portfolio relating to the lender and associated with a distributed ledger system, and a borrower portfolio relating to the borrower and associated with the distributed ledger system. The method may further include creating a loan token for use with the distributed ledger system, wherein the loan token is associated with the loan information and includes a plurality of loan token units. The loan token units may be transmitted to an escrow portfolio associated with the distributed ledger system, wherein the escrow portfolio is associated with required signers, such as the borrower, the lender, a servicer and a validator. The method may also include creating a first distributed ledger transaction to transfer the loan token units from the escrow portfolio to the lender portfolio, and transferring the loan token units from the escrow portfolio to the lender portfolio, based on a determination that all of the required signers have signed the first distributed ledger transaction.

In another exemplary embodiment, a method is provided wherein borrower information, such as a borrower portfolio associated with a distributed ledger system, may stored. Lender information, such as a lender portfolio associated with the distributed ledger system, may also be stored. Additionally, loan token information relating to a loan token associated with the distributed ledger system may be stored. Such loan information may include, but is not limited to, a unique ID, a total number of loan token units of the loan token, a total principal amount of an underlying loan to which the loan token corresponds, the borrower information, and/or the lender information. The method may include receiving payment information relating to a loan payment made by the borrower to the lender, wherein the loan payment information may relate to the unique ID and a principal payment amount. The method may further include: searching the distributed ledger system, based on the unique ID, to determine a plurality of owner portfolios, each owner portfolio owning a portion of the total number of the loan token units; determining, for each of the owner portfolios, a percentage token ownership, based on the portion of the loan token units owned by the respective owner portfolio and the total number of the loan token units; determining disbursement information including a disbursement amount for each of the owner portfolios, based on the principal payment amount and the respective percentage token ownership; and/or transmitting the disbursement information to the lender.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 12 shows an exemplary trading interface screen 1200 according to an embodiment.

DETAILED DESCRIPTION

Various systems and methods are provided herein that employ distributed ledger technology to facilitate origination, payment, disbursement, transfer, validation, distribution, recordation and/or other transactions relating to financial instruments, such as loans (e.g., mortgages) and securities (e.g., RMBS). The described embodiments may be employed to increase efficiency, data integrity, and transparency in various financing markets that require proof of existence, records of ownership, contractual payment terms, and/or complex ownership structures. Moreover, the embodiments may prevent manipulation of transactions relating to loans and securities (e.g., origination, loan purchase, monthly payments, loan trading and/or loan payoff/termination), by requiring consensus and verification of specific parties in order to record transactions.

In certain embodiments, a unique digital asset referencing a single loan (e.g., a mortgage) may be created and recorded in a distributed ledger, such as the blockchain. Such digital assets (also referred to as "loan tokens" or "tokens") may be employed to facilitate recordation, confirmation and validation of various loan and securitization transactions among multiple parties, such as borrowers, originators, lenders, investors, servicers, validators and others.

To provide numerous benefits in diversification and risk management, each of the loan tokens may be divided into a plurality of units that may be transferrable from one party to another. The described embodiments may further allow for a party to aggregate token units of multiple tokens into diversified token pools. Such embodiments may further allow for owners of multiple pools of loans (e.g., a trust) to employ a single master to manage such pools. Accordingly, the embodiments may reduce the high costs of legal fees and securitization fees associated with managing securities (e.g., RMBS), while providing decreased long-term volatility, prepayment risks, and default risks to investors.

Although the embodiments are described below in relation to mortgages and RMBS, it will be appreciated that the embodiments are not limited to any particular type of loan or security. Rather, the embodiments may be employed to manage complex transactions among any number of parties relating to individual or securitized loans of any type, such as: mortgages, auto loans, appliance loans, payday loans, personal loans, student loans, loans for veterans, small business loans, cash advances, home equity loans, etc.

Figure 1:
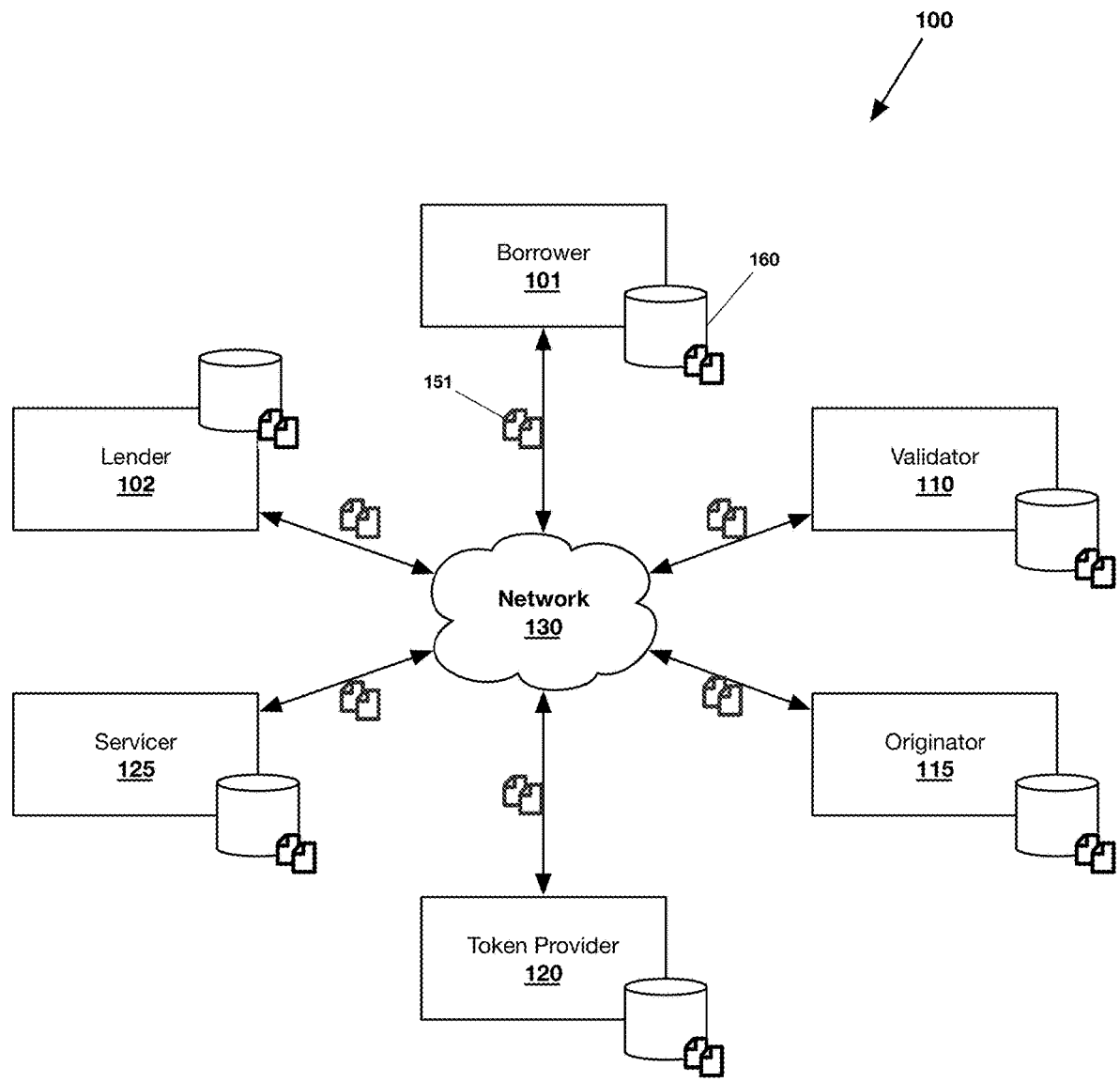
FIG. 1 shows an exemplary distributed ledger system 100 according to an embodiment.

Referring to FIG. 1, an exemplary distributed ledger system 100 according to an embodiment is illustrated. As shown, one or more distributed ledgers (e.g. blockchains) 151 are provided across a number of entities, such as a borrower 101, a lender 102, a servicer 125, a token provider 120, an originator 115, and a validator 110.

Generally, the entities may store the distributed ledgers 151 on computing systems, which may be utilized in maintaining and/or updating the ledgers. Each entity may be configured for storing a version of the distributed ledger (or a portion thereof), and the distributed ledger may be updated from time to time with modifications to the ledger and/or ledger entries, such as insertion of a ledger entry or an update of a ledger entry.

In some embodiments, the entities include at least a decentralized set of computing devices and may even include personal computing devices for individuals, and so on. For example, a ledger may be stored on a large number of publicly available devices, each acting as a "node" 160 for storing a copy of the ledger (e.g., being collaboratively maintained by anonymous peers on a network). In some embodiments, the ledger is only stored and maintained on a set of trusted "nodes," such as the computing systems of authorized users. In some embodiments, a combination of both trusted nodes and public nodes may be utilized, with the same and/or different rules being applied to activities performed at each (e.g., a different validation process may be used for untrusted nodes, or simply untrusted nodes may be unable to perform certain activities). In some embodiments, there may be different levels of nodes with differing characteristics and applied business logic.

The ledgers, ledger entries, and/or information stored in the ledger entries may be used for financial transaction records, such as loan records (e.g., mortgage records). In one embodiment, each ledger entry may include one or more of: loan information, transaction information, history information, and/or automated "smart contracts." Smart contracts are computer protocols or code intended to facilitate, verify, or enforce the negotiation or performance of a contract.

As discussed below, there may be various rules and/or logic involved in activities relating to the ledger entries (e.g., creating, updating, validating, deleting). For example, a supermajority or a unanimous consent between entities may be enforced as a condition to an activity relating to an entry. Further, the ledger and ledger entries may utilize encryption technology to facilitate and/or validate digital signatures, for example, facilitating multi-signature documentation and ensuring the integrity of loan records.

In some embodiments, the ledger 151 is publicly accessible. In some embodiments, the ledger is only accessible to select, authorized entities having the appropriate permissions. In some embodiments, portions of the ledger are public and portions of the ledger are private. When the ledger is publicly accessible, the ledger may be adapted to only store information incidental to a transaction or a document relating to a loan, and may be adapted such that identifiable information is removed but validation information is maintained (e.g., storing a hash value computed from the underlying information such that a ledger entry can be utilized to validate a specific financial system entry that is held as part of an organization's business records in relation to a contractual obligation). The loan and transaction information stored on the ledger may be encrypted, redacted, compressed, and/or transformed (e.g., through a one-way transformation or a reversible transformation).

Each of the entities may have, at various times, versions of the ledger, and the ledger may be maintained through the propagation of entries and/or updates that may be copied across ledgers. In some embodiments, distributed ledgers are utilized and the ledger entries are adapted to have various linkages to one another such that the integrity of the ledger entries can be reinforced and/or validated. For example, the linkages may include hashes computed based on prior entries in the ledger, which may be utilized to determine whether a ledger entry is a fraudulent entry by reviewing the correctness of the hash based on performing the hash on information stored on prior entries.

The ledger may be maintained through, for example, a distributed network system 130 providing decentralized control and storage of the ledger at the one or more entities (which may be considered "nodes" of the system). The number of nodes may be fixed or vary with time, and increasing or decreasing the number of nodes may impact the performance and/or security of the system.

In one embodiment, a blockchain ledger may be distributed across entities and used to track information relating to various loan assets, obligations, contracts, documents, etc. The blockchain ledger may have entries linked to one another using cryptographic loan records, and entries in the blockchain may be ordered, time stamped, and/or associated with metadata such that the blockchain is designed for protection against double transfers and unauthorized modification of ledger entries. In certain embodiments, once validated and recorded, such transactions are immutable and as such, unchangeable, adding additional protection against fraudulent activity. In other embodiments, changes or deletions would require consensus by the authorized users.

The system may be adapted such that where issues arise with the distributed ledger (e.g., hash collisions, insertions at the same time, corrupted ledgers/ledger entries), the issues are automatically resolved based at least on issue resolution logic. For example, such logic may be distributed among each of the entities and/or their computing systems. The ledger copies stored and maintained at each node 160 may provide cross-validation with one another in the event of conflicts between ledgers, and various cryptographic and/or hashing algorithms may be utilized during the generation, updating, deletion, linking, and so on, of ledger entries such that ledger entries have increased resiliency to unauthorized tampering or modification.

Figure 2:
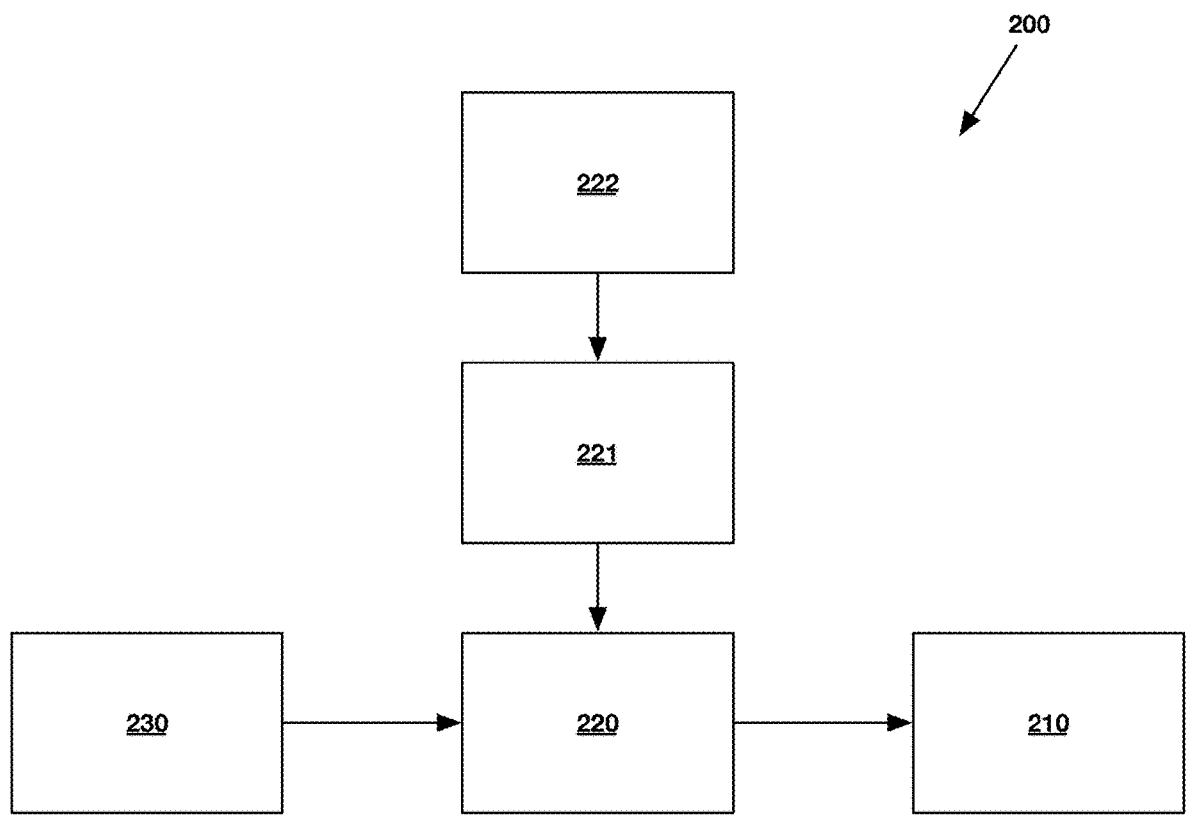
FIG. 2 shows an exemplary blockchain 200 comprising multiple blocks according to an embodiment.

Referring to FIG. 2, an exemplary blockchain 200 according to an embodiment is illustrated. As shown, block 210, block 220, and block 230 provide a loan record. As an example, block 2 can have different versions or updates, such as block 221 and block 222.

In some embodiments, each block includes a unique loan ID (corresponding to a particular loan) along with corresponding loan information and/or transaction information. Each block also includes a timestamp indicating when the block was created. If there is more than one block in the blockchain each block beyond a first block further includes a hash of a previous block in the blockchain.

Generally, loan information may comprise: loan terms and conditions (e.g., origination date, loan amount, annual percentage rate ("APR"), term, down payment amount, monthly payment amount, prepayment penalties, etc.); property information (e.g., state, zip code, appraised value, original loan-to-value, current loan-to-value, purchase price); borrower information (e.g., identification information, property information, borrower payment history, credit score, property tax history, tax return history, income history (e.g., pay stubs, W-2s, proof of income, etc.), bank statements, assets, renting history); co-signer information (e.g., identification information, income history, credit score); lender information (e.g., identification information, transaction history, etc.); related documents (e.g., evidence of insurance, pre-approval letter, purchase agreement, down payment gift letters, etc.); etc. And transaction information may comprise: the nature of the transaction, parties to the transaction, document sections, contractual clauses, version information, status of the transaction (e.g., pending, validated, signed), transaction amount, transaction date, and/or electronic representatives or derivatives of the same.

In one embodiment, a loan record may be made up of a set of blocks (e.g. block 210, block 220, block 230) with data relating to an underlying loan. Each block for a particular loan record can include the same unique loan ID and different loan records are provided by different sets of blocks that include different loan IDs. Loan records may be maintained using blocks organized in blockchains stored in blockchain storage of entities (e.g., FIG. 1 at 160).

The blocks may be connected to one another through various linkages, for example, each linkage may be formed based on a hash computed from part or all of a previous block or a portion thereof (e.g. unique loan ID). For example, block 210 may be the initial block and block 220 may be connected to block 210 and include a hash computed from block 210. There may be various versions of blocks, for example, block 221 and block 222, which may be updated and/or modified versions of loan or transaction information stored in block 220. Other implementations, topologies and/or arrangements may be provided.

Generally, entities can be granted permission attributes or access to write new blocks to the blockchain and/or update loan records with different loan-related transactions and events. For example, as discussed below, a new block can indicate that a borrower has made a monthly payment or that a token unit was transferred from one entity to another.

Access to write new blocks for a loan record can be restricted to certain authorized entities. An authorized entity can be verified before writing new blocks for a loan record. In certain embodiments, a block of the loan record may include a smart contract for a given loan transaction such that the transaction may only be recorded to the blockchain when certain conditions are met.

In some embodiments, when an entity writes a block to an existing loan record, any of the other entities associated with the loan may be notified by way of a notification message (e.g., an email, text message, or push notification via a client application).

Figure 3:
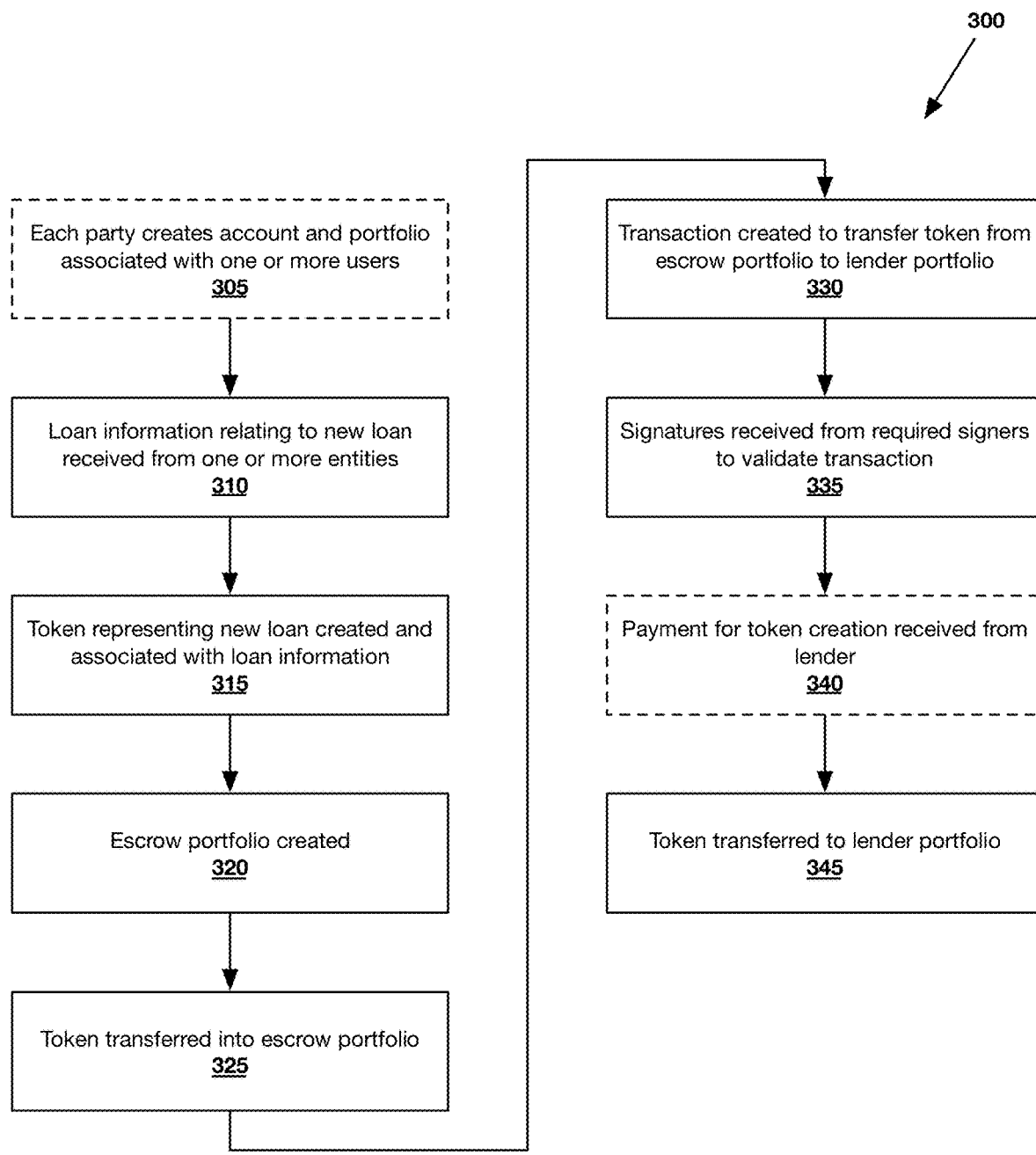
FIG. 3 shows an exemplary loan creation method 300 according to an embodiment.

Referring to FIG. 3, an exemplary loan management method 300 is illustrated. As shown, the method may begin at optional step 305, where various entities may create an account, associate one or more authorized users with the account, create a distributed ledger portfolio and/or associate one or more users with the portfolio. Exemplary entities may include: a borrower, a lender, an investor, a validator, an originator, a token provider, a servicer, etc.

Generally, each of the parties involved in a loan transaction must create an account to interact with the system. An account may be associated with one or more authorized users, each of which may be further associated with various levels of access to the system. For example, a user associated with a lender account may be permitted to view and update the account's profile information. The user may also be permitted to view loan information relating to loans associated with the lender account.

In order to hold, receive and/or transfer the digital assets discussed herein, each party must also be associated with a distributed ledger portfolio (e.g., a digital wallet). It will be appreciated that a single account (e.g., a lender account) may be associated with one or more portfolios, and one or more users associated with an account may be granted access to view, create, update, and/or delete one or more of such portfolios.

For example, a first user associated with a lender account may have permission to sign transactions relating to digital assets held in a first portfolio of the lender account, but may not have any permissions with respect to a second portfolio. Accordingly, such user is an "authorized user" with respect to the lender account and the first portfolio, but is not an authorized user with respect to the second portfolio.

At step 310, loan information relating to a new loan is received and/or determined by the system. In addition to the above-listed information, loan information may further comprise portfolio information relating to portfolios associated with relevant parties to the loan. For example, the portfolio information may specify: a lender portfolio to receive a loan token representing the loan and a borrower portfolio to which units of the token will be transferred upon payment to the lender. Generally, each of the portfolios included in the portfolio information may be represented by a unique portfolio ID, such as a digital wallet address.

At step 315, a loan token representing the new loan is created and associated with the received/determined loan information. For example, a $200,000.00 original mortgage balance may be referenced by a 200,000.00 unit, unique loan token (e.g., "LQM0001 token") relating to the outstanding principal balance of the referenced mortgage. As discussed in detail below, such loan tokens may be tracked and traded on a distributed ledger, such as the blockchain, and the token and underlying mortgage may trade together until the mortgage is either paid off or refinanced.

At step 320, an escrow portfolio is created and, at step 325, the loan token is stored in the escrow portfolio. Generally, an escrow portfolio may be required to hold the loan token and/or other significant items (e.g., property tax payments, home insurance payments, etc.) for a predetermined amount of time or during pendency of loan agreements and/or finalization of loan documents. For example, an escrow portfolio may be required before an agreement is reached regarding important terms of the loan (e.g., mortgage rate, term of loan, etc.); or before a finalized sale (e.g., the finalized sale of a home) where a high-risk loan is involved (e.g., a loan with a down payment of less than 20%).

Depending on the loan information associated with the new loan, the escrow portfolio may be designed such that any transactions relating to loan tokens stored therein must be signed/validated by various required signers. For example, at origination of a mortgage, various parties must all agree upon existence of the loan, existence of the lender purchase agreement, borrower acceptance of the lender purchase agreement, terms of the servicing agreement, accuracy of loan information provided to the system, disbursement of funding, etc. Accordingly, an escrow portfolio may require signatures from all of the following parties before executing a transaction: an originator, a borrower, a lender, a servicer, and/or a validator.

In any event, once the escrow portfolio has been created, the initial loan token transfer has taken place into the escrow portfolio, and signers have been added to the escrow account, a transaction may be created at step 330 to validate the loan and transfer the token from the escrow portfolio to the associated lender's portfolio.

At step 335, a signature is received from each of the required escrow signers and the token transfer transaction is validated. And, at step 345, the validator may sign the transaction, moving the loan token from the escrow account into the assigned lender portfolio account.

In certain embodiments, the escrow signers may need to sign the transaction in a specific order. As an example, the servicer of a mortgage may sign first, followed by the borrower. Next, the transaction may be sent to the originator to sign. Finally, the portfolio signer (lender) may agree to the price and terms of the loan, transfer funds corresponding to the loan amount to a borrower account, and sign the transaction.

In certain embodiments, various entities (e.g., the validator, escrow signers, token providers, etc.) may be paid for services rendered, future services, etc. For example, at optional step 340, the lender may purchase the loan token from a token provider in return for future services (e.g., token creation, validation, infrastructure maintenance, data aggregation, etc.). The price of a token may be paid upfront or on an ongoing basis (e.g., monthly, bi-monthly, weekly, etc.). And, in some embodiments, the token price may be deducted from the borrower's monthly loan payments.

Generally, upon the fulfillment of a signer's validation services, the signer may be removed from the account. For example, the originator may be removed as an escrow account signer after the loan token transfer.

It will be appreciated that, in some embodiments, an escrow portfolio may not be required. In such embodiments, the token may be directly transferred to the lender portfolio (step 345) after it is created and associated with loan information (step 315).

Although not shown, in certain embodiments, a servicing token may be created (e.g. "LQS0001 token") to reference the loan servicing rights associated with a specific loan. Generally, one servicing token may be issued per loan and the owner of the servicing token has the right to service that specific loan and earn associated servicing fees. Similar to the loan token, the servicing token may be placed in an escrow account until all required parties sign off on the initial loan origination transaction. Typically, signers on the servicing escrow account will include the servicer and lender. It will be appreciated that, like the loan token, the servicing token may be transferred between parties with appropriate signatures.

Figure 4:
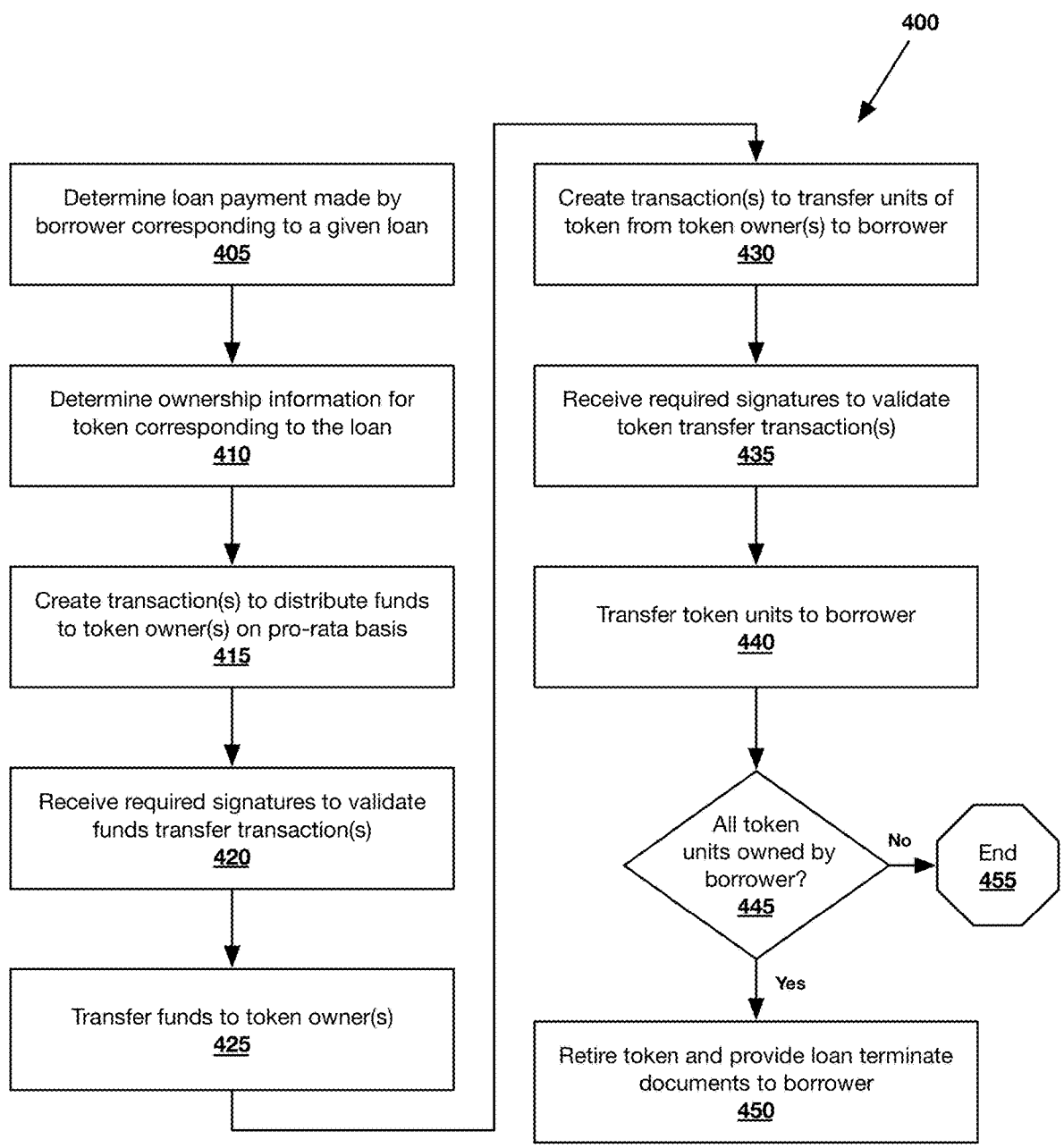
FIG. 4 shows an exemplary method 400 of receiving borrower payments and distributing funds to lenders/investors.

Referring to FIG. 4, an exemplary method 400 of receiving borrower payments and distributing funds to lenders/investors is illustrated.

At step 405, the system may determine that a borrower has made a payment corresponding to a loan being managed by the system (i.e., a loan represented by a token). Generally, a borrower payment may comprise principal and interest, and such payment may be made on a one-time basis and/or on a recurring basis (e.g., monthly).

In one embodiment, the borrower may make a payment by signing into a client and manually pay the monthly amount by creating a transaction to transfer payment relating to the loan ID on the blockchain. The system may automatically determine the loan ID if the borrower is associated with only one. In embodiments where the borrower is associated with more than one loan ID, the borrower may manually select or input the loan ID that the transfer pertains to. In other embodiments, the borrower may link his account to his bank account or credit card and schedule recurring monthly automatic payments relating to the loan ID.

In one embodiment, the system may automatically determine that a payment has been made by the borrower via a notification of a new transaction created relating to a specific loan ID. In other embodiments, the borrower may be associated with a public key, allowing the system to identify previous transactions and determine, based on logic rules, which loan the payment is associated with. Additionally or alternatively, the system may automatically create scheduled dates for when each monthly payment expected, and may determine whether the borrower has transferred payment at that time. In yet other embodiments, one or more authorized users may be notified by the system of the transaction to transfer payment. Additionally or alternatively, the one or more authorized users may manually look up transactions relating to the loan ID.

In embodiments where the system automatically creates scheduled dates for each expected monthly payment, the system may also automatically determine that a borrower has missed a payment. In such embodiments, after a predetermined grace period (e.g., 15 days), the system may automatically determine a late fee. The system may then either transmit the late fee to the borrower via an invoice, charge the late fee on the borrower's credit card, automatically withdraw the late fee amount from a linked bank account, etc.

Upon determining that a payment has been received for a particular loan, the system may determine ownership information for the loan token corresponding to the loan 410. That is, the system may determine (1) each owner of the token associated with the loan and (2) the number of units of the loan token owned by each owner. The system may also determine a percentage ownership for each token owner based on the total number of token units.

In one embodiment, the system may use the unique loan ID associated with a borrower payment to locate the corresponding loan record in the distributed ledger. And the system may then parse the loan record (i.e., each block associated with the loan ID) to determine ownership information.

At step 415, one or more transactions are created to distribute the received payment among the various token owners based on the determined ownership information. Generally, the system may distribute the received payment at a predetermined time (e.g., 1 day) after receiving the borrower payment. Therefore, distribution of the payment is conditioned upon receiving the payment in the first place.

At step 420, the fund transfer transaction(s) may be validated and signed by authorized signers and recorded. And, at step 425, the system transfers funds to the token owner(s).

It will be appreciated that, because the loan token directly corresponds to the underlying loan, the system may distribute borrower payments to token owners on a pro-rata basis (i.e., based on percentage token ownership). For example, if the system determines that a lender owns 20% of the outstanding units of a token, a first investor owns 30% of the token units, and a second investor owns 50% of the token units, the system may distribute 20% of the payment received from the borrower to the lender, 30% to the first investor and 50% to the second investor (less any spread/fee).

Generally, the principal portion of a borrower's payment may decrease token ownership on a one-to-one percentage basis. For example, if 0.5% of the original loan amount is paid in principal during a given month, 0.5% of the token may be transferred from the lender portfolio to the borrower (i.e., the borrower portfolio). As the borrower pays down the loan, the borrower may begin to acquire the loan token back from the lender/token owners. For example, if a borrower pays down $2,000 in principal in a given month on a $200,000 original mortgage, the borrower will receive 1% of the loan token for that payment. It will be appreciated that the percentage of a loan token owned by the borrower may be a non-financial interest in the loan token (i.e., principal and interest paid will not accrue to borrower-owned tokens).

Accordingly, at step 430, one or more transactions are created to transfer units of the loan token from each of the token owners to the borrower. At step 435, the token transfer transaction(s) may be validated and signed by authorized signers and recorded. And, at step 440, the system transfers the token units from the token owners to the borrower.

At step 445, the system may determine whether the borrower now owns 100% of the token (i.e., all token units), which signifies that the loan has been fully paid off by the borrower. If not, the process may end 455. However, if the system determines that the borrower is the only token owner, all units of the token may be transferred to the token creator at step 450 to be retired. In one embodiment, the borrower may receive a release of a security interest (e.g., a lien on property associated with the loan) and/or a termination statement in exchange for the return of the token to the token creator.

It will be appreciated that the above method of receiving payments from a borrower and distributing funds to loan token owners may require validation of additional or alternative transactions. For example, various embodiments may require a borrower, a token owner and/or a validator to validate one or more of the following transactions: proof of payment, lender distributions, creation of borrower payment, confirmation of token ownership structure, funding disbursement pro-rata to token owners, borrower receipt of principal token amount, observance of contractual terms, creation of borrower final payment, token owner's receipt of funds, borrower ownership of 100% of the token, and/or lender ownership of 0% of the token.

In certain embodiments, the system may determine most, if not all, aspects of such transactions and related documentation, without the need for servicer and/or trustee involvement. Although not shown, in the event of late payments or a default scenario, a third-party servicer could be hired to step in and manage the relationship with the borrower.

In one embodiment, the system may transmit one or more notifications during the above-described process. For example, the system may transmit payment reminders to borrowers at predetermined times before payments are due. As another example, the system may transmit successful payment notifications to borrowers and/or token owners upon determining that a borrower has made a loan payment. And, as yet another example, the system may transmit a notification to a party upon transferring a payment to the party and/or upon transferring token units to the party.

Figure 5:
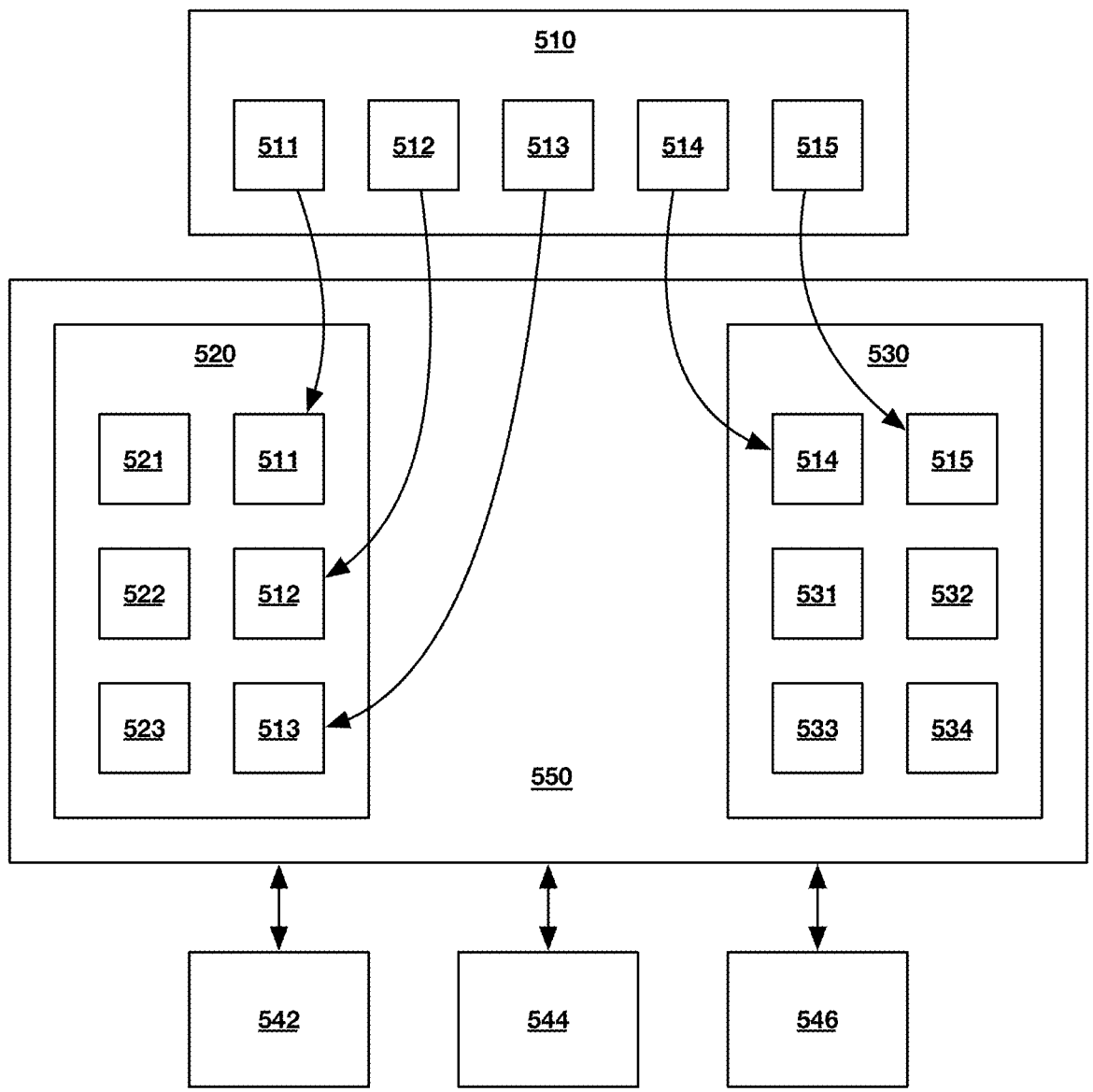
FIG. 5 shows an exemplary loan token ownership structure according to an embodiment.

Referring to FIG. 5, a block diagram showing an exemplary loan token ownership structure is illustrated. As shown, a loan token 510 representing a single loan (e.g., a mortgage) may be divided into a plurality of units 511-515, each of which may be controlled by one of a number of entities (e.g., trust 550).

In some embodiments, token units 511-515 may be aggregated into one or more token pools 520, 530. For example, token units 511-513 are associated with a first pool 520 and token units 514 and 515 are associated with a second pool 530.

Generally, each of the pools 520, 530 may include any number token units associated with any number of loan tokens. For example, token pool 520 is shown to contain token units 511-513 associated with a first loan token 510, and additional token units 521-523 corresponding to one or more other loan tokens. Similarly, token pool 530 is shown to contain token units 514 and 515 associated with the first loan token 510, and additional token units 531-536 corresponding to one or more other loan tokens.

It will be appreciated that each of the loan tokens 510 will be associated loan attributes of the underlying loan. For example, a loan token corresponding to a mortgage may be associated with some or all of the following mortgage attributes: attributed relating to the underlying borrower (e.g., FICO score), attributes relating to the underlying property (e.g., a state in which the property is located), an interest rate, and/or a Loan-to-Value ("LTV") ratio. Importantly, all units of a given loan token will be associated with the same loan attributes of the parent token.

Moreover, each pool may comprise pool attributes corresponding to the loan attributes of the loan tokens/token units contained within the pool. As an example, a pool containing only token units associated with mortgages where the underlying borrower has a FICO score of 700-730 will be associated with such attribute. As another example, a pool having a pool attribute of "California Only" may be created by including only loan tokens associated with mortgages where the underlying property is located in California. As yet another example, a pool having a pool attribute of "6-6.5% Interest Rate" may be created by including only loan token units associated with mortgages having an interest rate of 6-6.5%. And as yet another example, a pool having a pool attribute of "85-90% LTV" may be created by including only loan token units associated with underlying mortgages having an LTV of 85-90%.

A single loan may be associated with a plurality of loan attributes. Accordingly, when a loan token is split into multiple units, such units may be placed into a plurality of pools—even if those pools have different required pool attributes. For example, token units associated with loan attributes including "FICO scores from 700-730," "California Only," "6-6.5% Interest Rate," and "85-90% LTV" may be placed into any pool that requires any one of these attributes.

By dividing each loan token into units (and distributing the units across pools), pool-level diversification is increased as each pool will have exposure to many more loans. This, in turn, leads to lower prepayment risk, default risk and volatility. Moreover, because each token unit contained within a given pool is managed at the loan level, transaction costs, servicing costs and management costs are also reduced.

As further shown in FIG. 5, a plurality of token pools 520, 530 may be associated with a single ownership structure (e.g., trust 550). Generally, this allows for a number of investors 542, 544, 546 to invest in the structure 550.

In one embodiment, a hierarchical investor structure may be employed wherein the hierarchy corresponds to the order in which investors are paid in the case of a borrower default or prepayment. For example, senior investors 542 may have top priority in receiving payment in the case of a default or prepayment, then mezzanine investors 544, and finally, subordinate investors 546. Accordingly, the hierarchical structure may provide different risk/reward levels to investors.

By utilizing such ownership structures, the system allows for borrower payments to easily be split among each pool (e.g., based on % ownership of each pool) and among investors in a pool and/or a trust. Such payments are typically paid on a monthly basis, and a coupon amount may vary from month to month.

Another benefit of the depicted ownership structure is that it allows servicing and trust management to follow the same documentation and processes for all individual pools. As such, any type of prepayment and/or default on a loan may be treated the same, pro-rata across all owning pools.

In a less preferred embodiment, a units of a loan token may be divided among unrelated entities. In such cases, one of the token owners may seek consensus to change the management or servicing of that loan. Such transactions may be managed by ownership records and associated voting rights on a blockchain.

Figure 6:
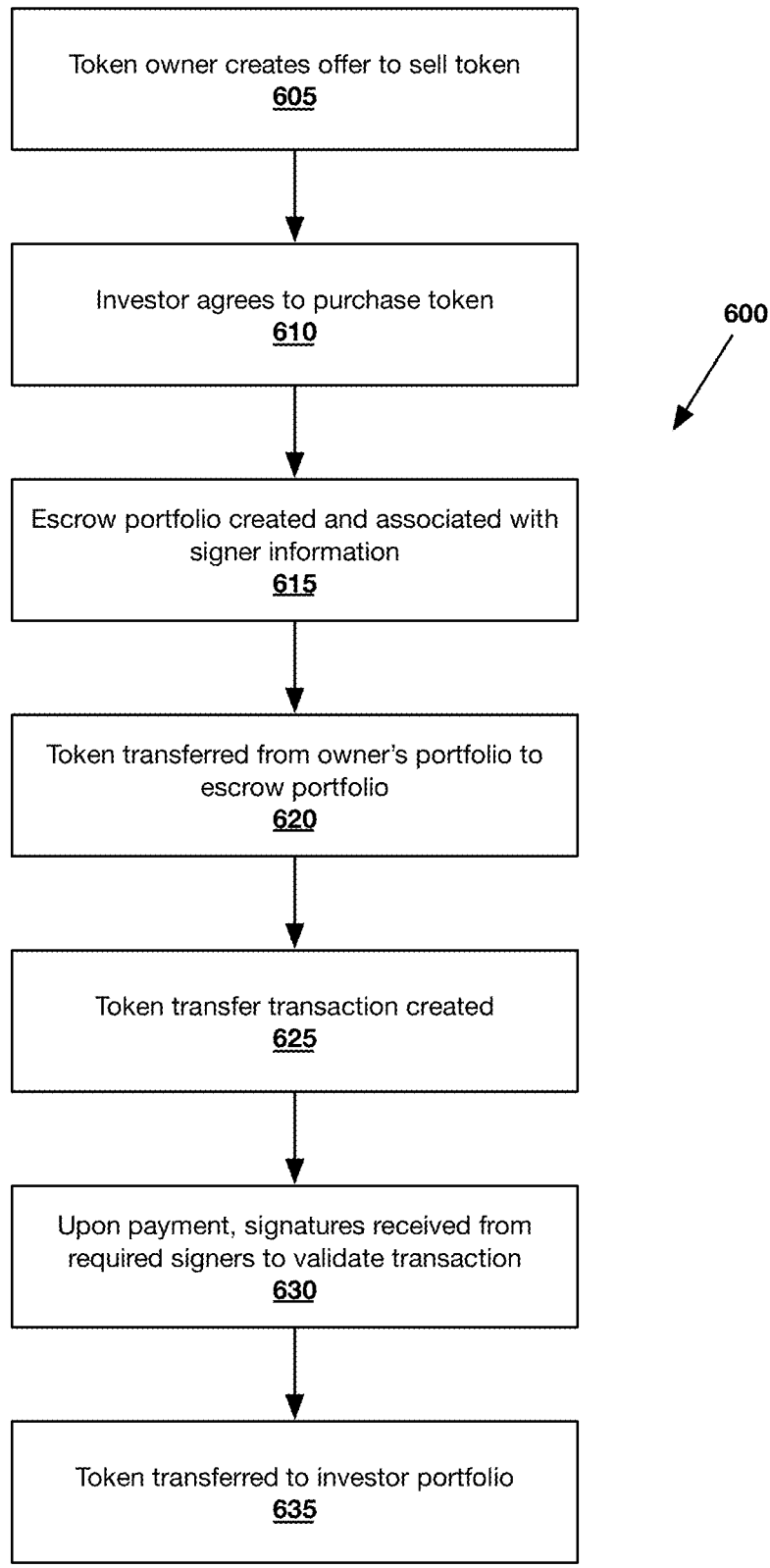
FIG. 6 shows an exemplary method 600 of trading loan token units according to an embodiment.

Referring to FIG. 6, an exemplary method 600 of trading loan token units is illustrated. At step 605, a loan token owner creates an offer to sell a token. And at step 610, an investor agrees to purchase the token.

At step 615, an escrow portfolio is created and associated with signer information, as described above. At step 620, the token units are transferred from the token owner's portfolio to an escrow portfolio, to which escrow signers are added. In one embodiment, a new servicer and the investor portfolio are added as signers to the escrow account.

At step 625, a transaction is created to transfer the token from the escrow account to the new portfolio. At step 630, the transaction requires signatures from both the new servicer, the servicer of the token owner's portfolio, and both the token owner's portfolio and the investor's portfolio. At step 635, the funds are transferred to the token owner's portfolio, a validator confirms receipt of funds by the token owner, and the token is transferred to the investor's portfolio. The token owner's portfolio and the servicer of the token owner's portfolio may then removed as signers on the escrow account to prevent bad actor activity.

Referring to FIGS. 7-12, exemplary user interface screens (700, 800, 900, 1000, 1100, 1200) of client applications are illustrated. Specifically, FIGS. 7-10 relate to an exemplary borrower client application and FIGS. 10-12 relate to an exemplary lender client application.

The interface screens display various application information relating to, for example, accounts, portfolios, users, loans, payments, and tokens. Such information may be received from users of the system and/or may be determined from one or more connected systems (e.g., a distributed network system).

As discussed above, a distributed ledger may maintain a loan record that tracks loan information and loan transactions (i.e., a history) linked to a unique loan ID. The transactions history is recorded in the distributed ledger via use of blocks, and each block includes the unique ID identifying the loan. Accordingly, in one embodiment, the system may dynamically compile a loan record by identifying and aggregating all blocks with the unique ID of a particular loan. Generally, the system may store such information in a database and may make some or all of the loan record available to authorized users by way of one or more user interface screens of client applications, an API, and/or via creation of digital reports that may be stored, printed and/or displayed.

Figure 7:
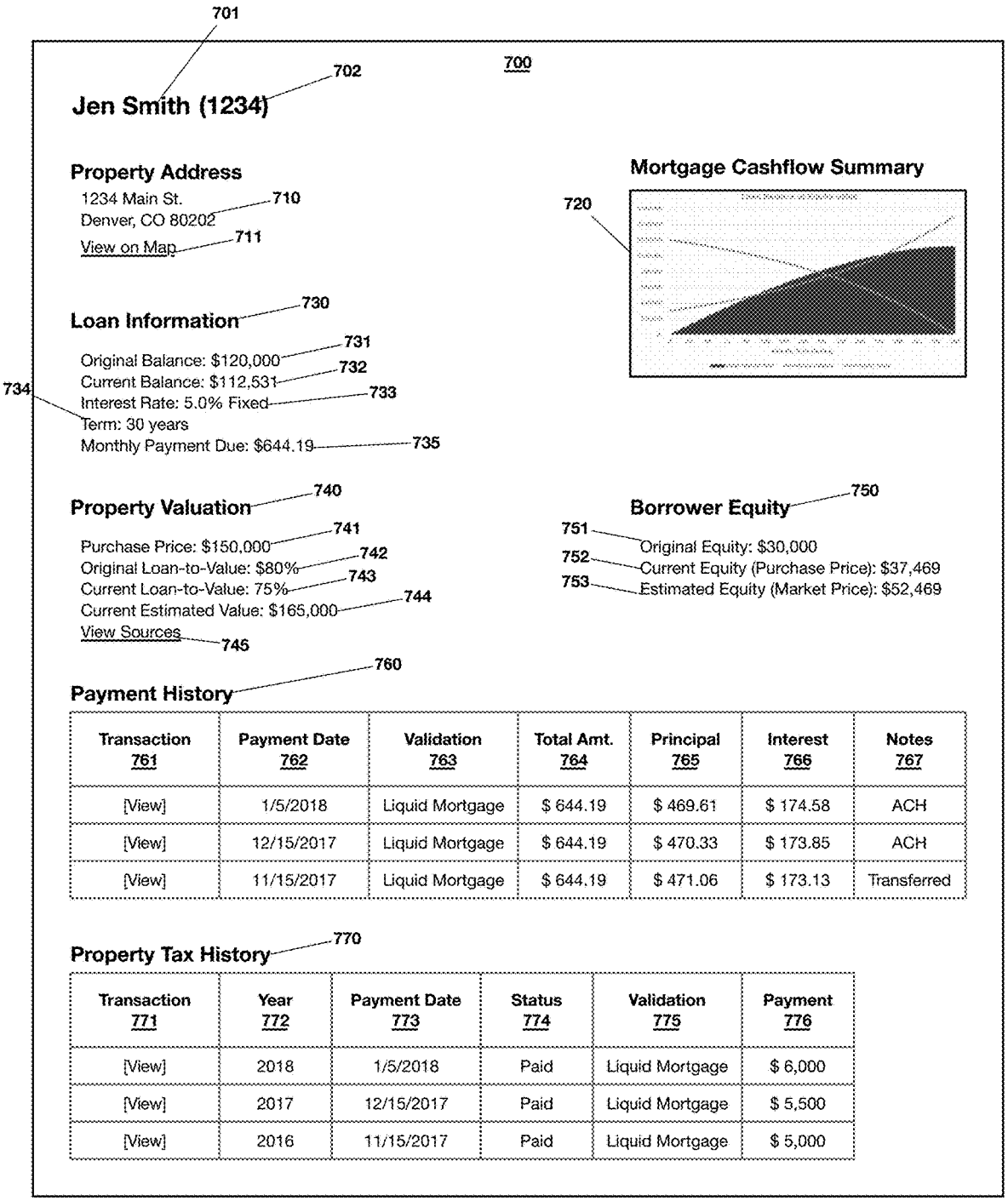
FIG. 7 shows an exemplary borrower dashboard screen 700 according to an embodiment.

Referring to FIG. 7, an exemplary borrower dashboard screen 700 is illustrated. Generally, this screen displays information about the borrower and about any loans associated with the borrower's account.

In the illustrated embodiment, the dashboard screen shows: identification information (e.g., unique borrower ID 702, name 701); property information (e.g., address 710, links to a map interface 711); mortgage cash flow summary 720 (e.g., interest paid, equity value, loan balance); loan information 730 (e.g., original balance 731, current balance 732, interest rate 733, term 734, monthly payments due 735); property valuation 740 (e.g., purchase price 741, original loan-to-value ("LTV") 742, current LTV 743, current estimated value 744, a link to view source information 745); borrower equity 750 (e.g., original equity 751, current equity or purchase price 752, estimated equity or market price 753); borrower payment history 760 (e.g., transactions 761, payment date 762, validation source 763, payment amount 764, principal amount 765, interest amount 766, ending balance, unique lender ID); payment history notes 767 (e.g., payment method, payment date, other notes); and/or property tax history 770 (e.g., transaction 771, year 772, payment date 773, status 774 (e.g., paid, due, missed payment, etc.), validation source 775, payment amount 776).

Figure 8:
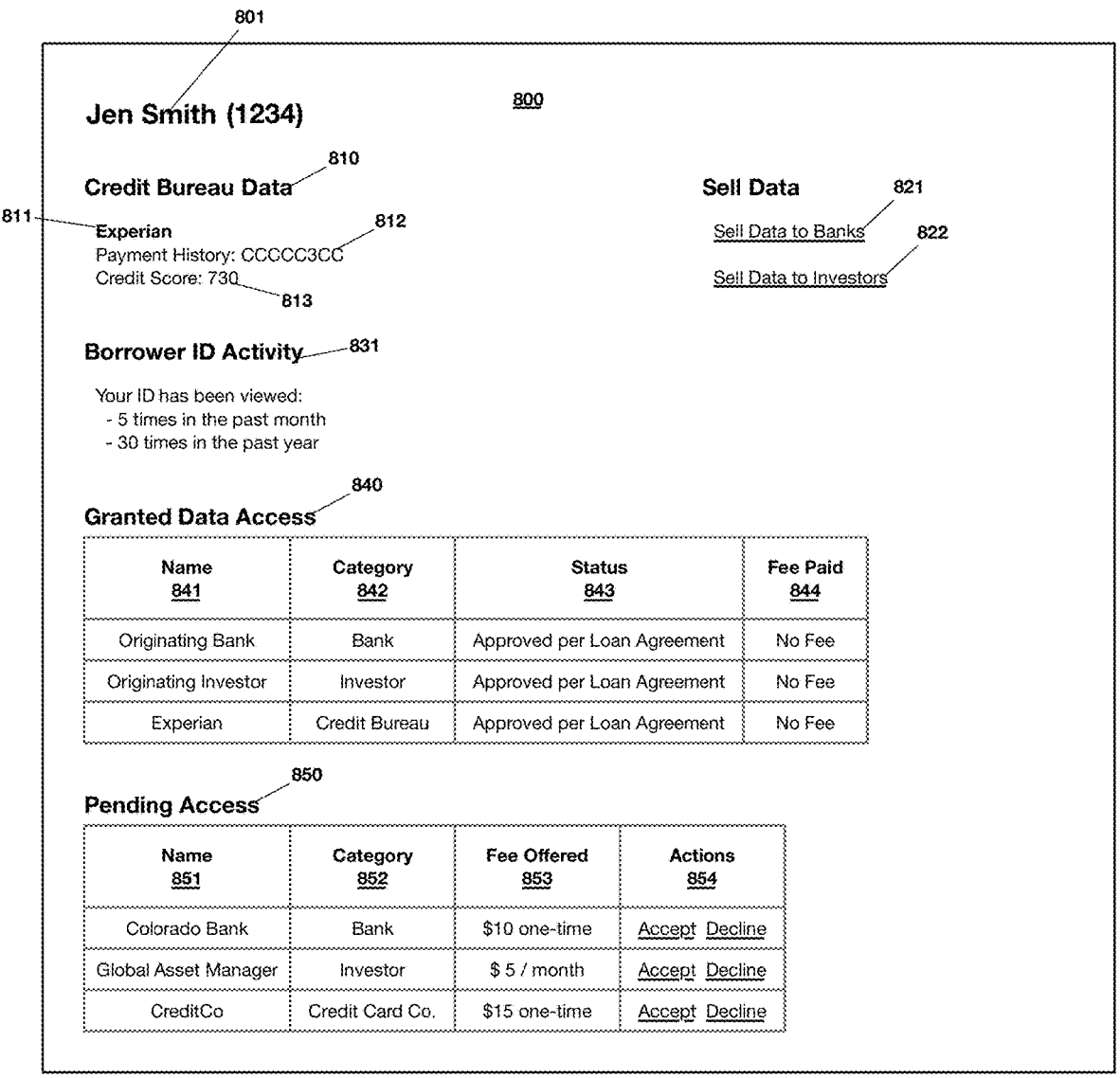
FIG. 8 shows an exemplary borrower data management screen 800 according to an embodiment.

Referring to FIG. 8, an exemplary borrower data management screen 800 is illustrated. This screen allows borrowers to view their personal information, determine which entities have access to such information, and/or select entities with which to share such information (e.g., for a fee). are allowed to view/use their data.

In certain embodiments, the system may prevent investors from accessing some or all of a borrower's personal information without their consent. However, certain embodiments may allow investors or other companies to pay borrowers for their loan data (subject to the borrower's approval). By allowing borrowers to sell data access, the system may provide an income stream for a borrower or may allow a borrower to access a lower rate.

As shown, the borrower data management screen 800 may display borrower information corresponding to a borrower 801 and any data access requests (e.g., granted 840, pending 850). The data access requests may include requestor information (e.g., name of the requestor 841, 851, category of requestor 842, 852); status 843 (e.g., approved, approved per loan agreement, pending, refused); fee paid/fee offered 853, 844 (e.g., recurring fee, one-time fee, no fee, etc.); and actions 854 for pending requests (e.g., accept, decline).

The screen 800 may also display credit bureau data 810, such as information issued by one or more credit score agencies 811 (e.g., payment history 812, credit score 813, etc.). Exemplary payment history 812 may indicate current payments, late payments (e.g., 30-days late, 60-days late), missed payments, etc.

In one embodiment, this screen 800 may further display borrower ID activity 831, which may include the number of times a borrower unique ID has been viewed over a period of time (e.g., past week, past month, past year, or a custom time frame). Finally, the screen may provide links allowing the borrower to sell data (e.g., to banks 821, investors 822, etc.).

Figure 9:
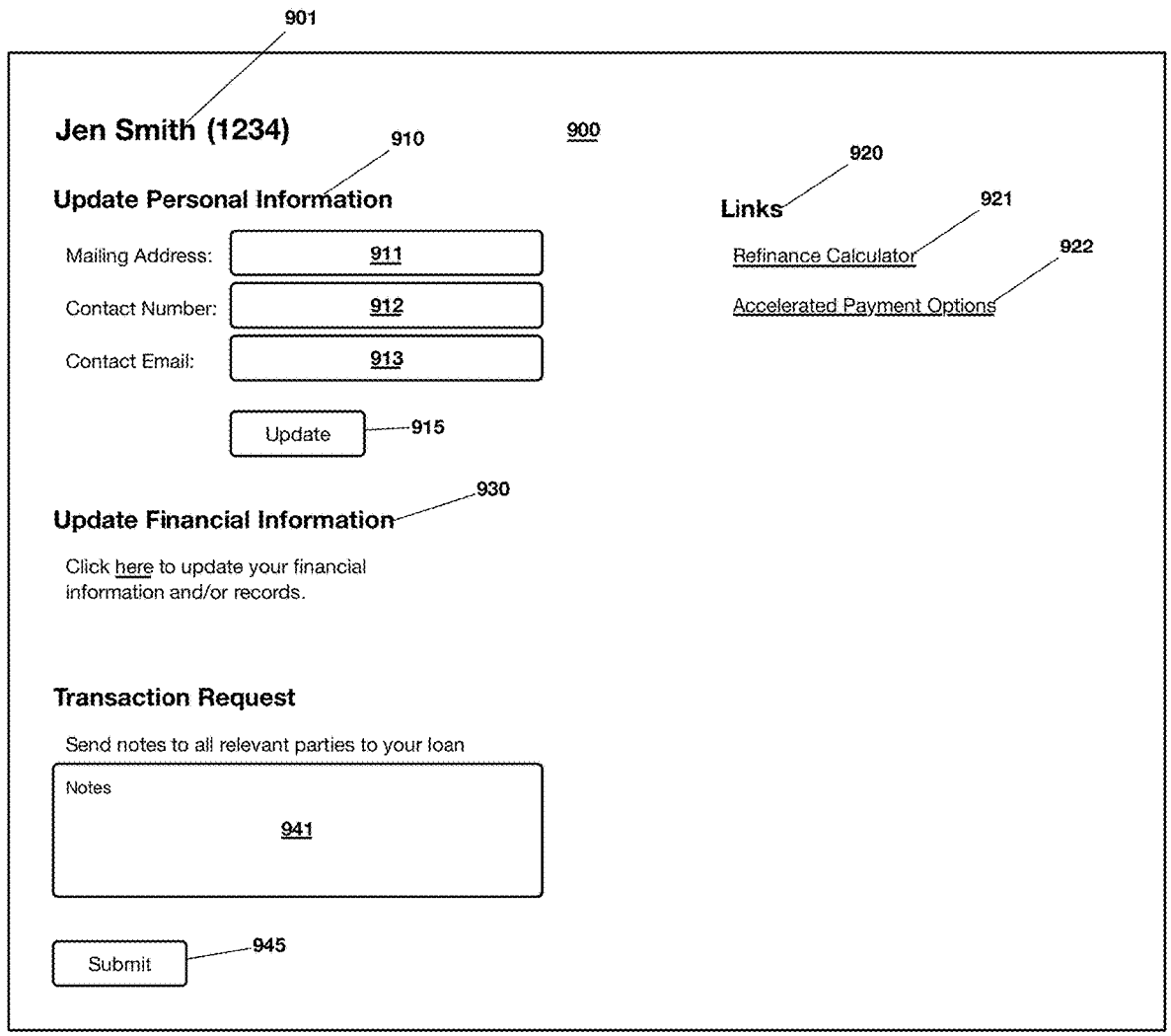
FIG. 9 shows exemplary borrower loan management interface screen 900 according to an embodiment.

Referring to FIG. 9, an exemplary borrower loan management interface screen 900 is illustrated. Generally, this screen may allow borrowers to update relevant information and records on the blockchain. In certain embodiments, the system may not store borrower information; rather, the system may interface with other applications and systems to update borrower information stored thereon (e.g., a blockchain system). In other embodiments, the system may provide tools to help borrowers consider when to refinance loans, sell loan assets, or consider other options.

In one embodiment, this screen 900 may allow a borrower 901 to view and/or update 915 personal information 910 (e.g., mailing address 911, phone number 912, email 913) and/or financial information/records 930. The screen may provide various link(s) 920, such as links to contact support, access a refinance calculator function 921, and/or to view accelerated payment options 922. Finally, this screen may also allow the borrower to submit transaction requests 945 (e.g., requests associated with a transaction ID) via a text input form 941.

Figure 10:
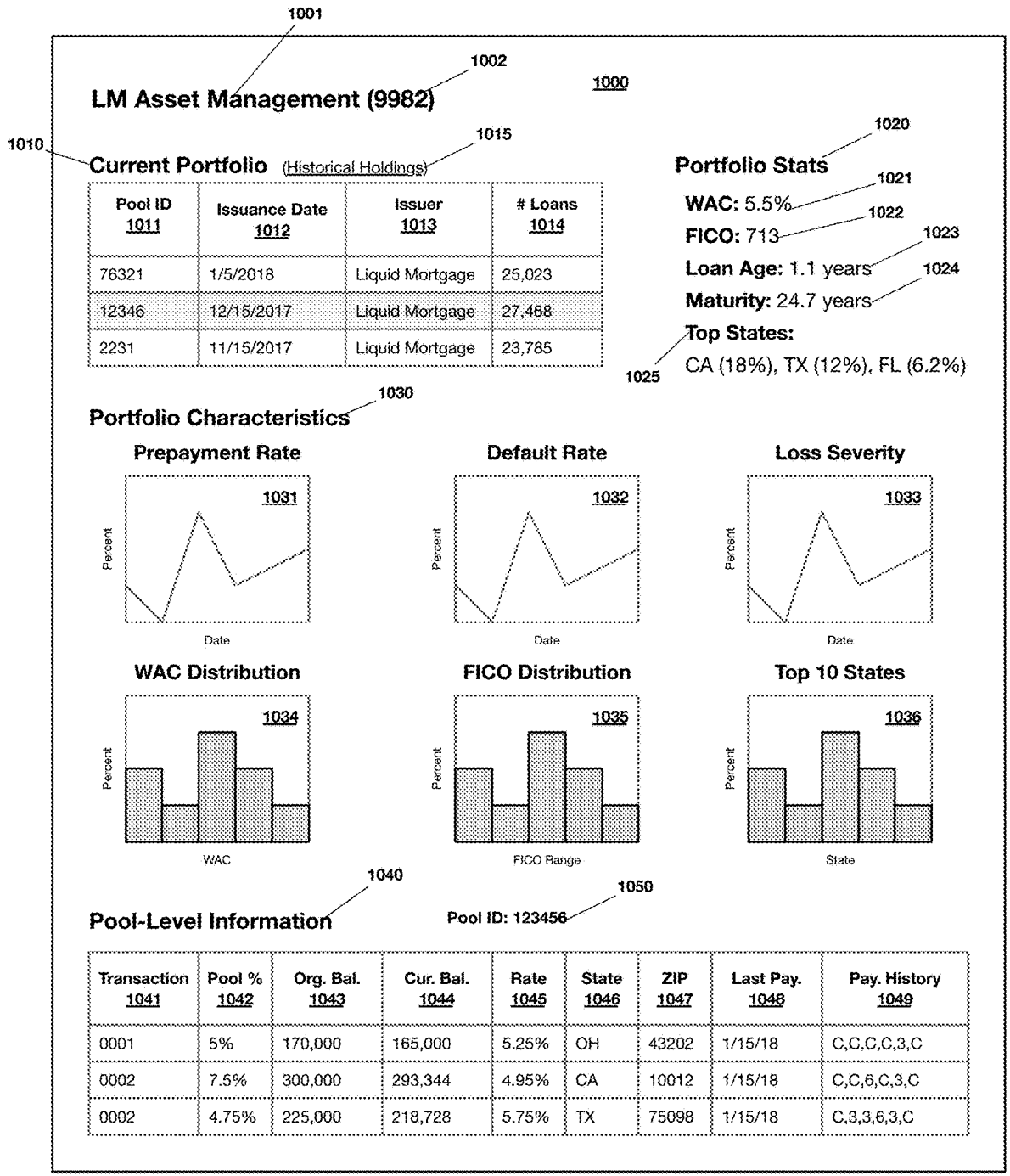
FIG. 10 shows an exemplary lender portfolio management screen 1000 according to an embodiment.

Referring to FIG. 10, a lender portfolio management screen 1000 is illustrated. Generally, the system provides lenders and investors information relating to all of their investments. Such information includes the pool-level data shown in FIG. 10, along with the ability to drill-down to loan-level data for each loan included in a given pool (shown in FIG. 11). While the system provides risk analysis, all data may be downloadable (e.g., as a csv or text file) for easy use in current risk management systems. The system may also provide for an API to allow for integration with third-party systems.

As shown, the lender portfolio management screen 1000 may display the following information: lender information (e.g., name 1001 and lender ID 1002); a list of pools associated with a selected portfolio 1010 including pool information for each (e.g., pool ID 1011, issuer 1013, issuance date 1012, number of loans 1014, a link to view historical holdings 1015, etc.); portfolio statistics 1020 across all pools in a portfolio (e.g., WAC 1021, FICO 1022, loan age 1023, maturity 1024, top states 1025, etc.); and portfolio characteristics/analytics 1030 across all pools in a portfolio (e.g., prepayment rate 1031, WAC distribution 1034, default rate 1032, FICO distribution 1035, loss severity 1033, top 10 states 1036, etc.).

In one embodiment, the portfolio management screen 1000 may also display pool-level information 1040 for a selected pool. Exemplary pool-level information may include, transaction number 1041, loan ID 1050, pool percentage 1042, original balance 1043, current balance 1044, rate 1045, state 1046, zip code 1047, last payment 1048 and/or payment history 1049.

Figure 11:
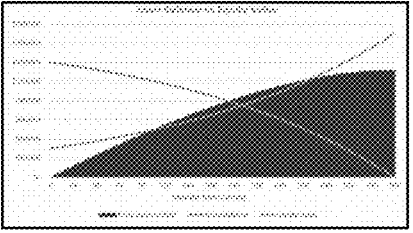
FIG. 11 shows an exemplary lender loan-level access screen 1100 according to an embodiment.

Referring to FIG. 11, an exemplary lender loan-level access screen 1100 is illustrated. As discussed above, transactions may be anonymous, because buyers and sellers may be recognized only by their unique ID hash. Although other investors may be able to see transactions, identities of buyers and/or sellers may be kept anonymous through the technology.

Generally, all non-personally identifiable information of borrowers associated with a particular loan may be made available to investors and/or lenders through the system (e.g., via the loan-level access screen). While the screen may not display a borrower's PII, it may display all transactions posted to the blockchain by the borrower (e.g., under a specific borrower ID). In one embodiment, the borrower ID may be shown in the form of a hash such that it cannot be traced back to a borrower. Similarly, the screen may display only a portion of a property's physical address such that the borrower's identity may be kept confidential.

In one embodiment, the loan-level access screen 1100 may display similar information as the borrower dashboard of FIG. 7. For example, this screen 1100 may display the following information for a particular loan: loan ID 1101, borrower ID (hashed) 1111; loan details 1110 (e.g., payment status, payment history, origination date, original FICO, interest rate, interest type, term, original balance, current balance, monthly payment due); property information 1120 (e.g., state, zip code, purchase price, original loan-to-value, current loan-to-value, current estimated value); mortgage cash flow summary; borrower equity 1130 (e.g., original equity, current equity, estimated equity); payment history notes 1140 (e.g., date, payment method, type, parties, etc.); and/or property tax history 1150.

Referring to FIG. 12, an exemplary lender trading platform screen 1200 is illustrated. As shown, this screen 1200 allows lenders and investors 1201 to buy and sell loan tokens representing underlying loans.

In one embodiment, the trading platform screen 1200 may display current portfolio information 1210 relating to each loan token in which the investor owns an interest. Such information may include, for example, a pool ID 1211 relating to the pool to which a given token is associated; current notional 1213; issuer 1214; issuance date 1212; number of loans 1215; and/or available actions 1216 for a given token.

This screen may allow a user to enter/select various trade information 1220 in order to trade a selected token and/or investment in a pool of tokens (e.g., pool ID 1230). Exemplary trade information may include, but is not limited to: a select transaction type 1221 (e.g., sell transaction, buy transaction); original notional 1222; offer price 1223; and/or various trade options 1240 (e.g., a known ID 1242 if the seller has already arranged a transaction with a counterparty and knows their investor ID, broad offer 1243, or bid wanted in competition ("BWIC") 1241).

The screen may also display various information relating to a selected token/pool. For example, the screen may display historical ownership 1250 information (e.g., original notional outstanding 1251, current notional outstanding 1252, pool factor 1253); top holders (e.g., investor ID (hashed) 1261, percent outstanding 1262, original notional 1263); and/or transactions 1270 (e.g., transaction ID 1271, type, date 1272, original notional 1273, price 1274, buyer 1275, seller 1276).

Generally, the servicer assigned to a specific loan will have dashboard access to all underlying data and information about the loan and borrower account. This includes, but is not limited to: original loan documents, borrower payment history, property information, lender information, previous servicing interaction, etc.

The embodiments disclosed thus allow all data regarding a loan to remain in one location for the life of the loan. Servicing transfers are thus no longer necessary, as no information changes hands upon a new servicer assignment. Additionally, borrowers make payments to one system over the life of the loan rather than changing payment locations as servicers change.

Moreover, when the servicer is given access by a lender or originator (e.g., via transfer of a servicing token), that servicer would have access to all relevant information. Any previous servicing relationship would lose access to the specified loan and not be allowed to retain data. In the event a servicer chooses not to use this model, API access may be granted for loan-level data to assist in default management.

Figure 13:
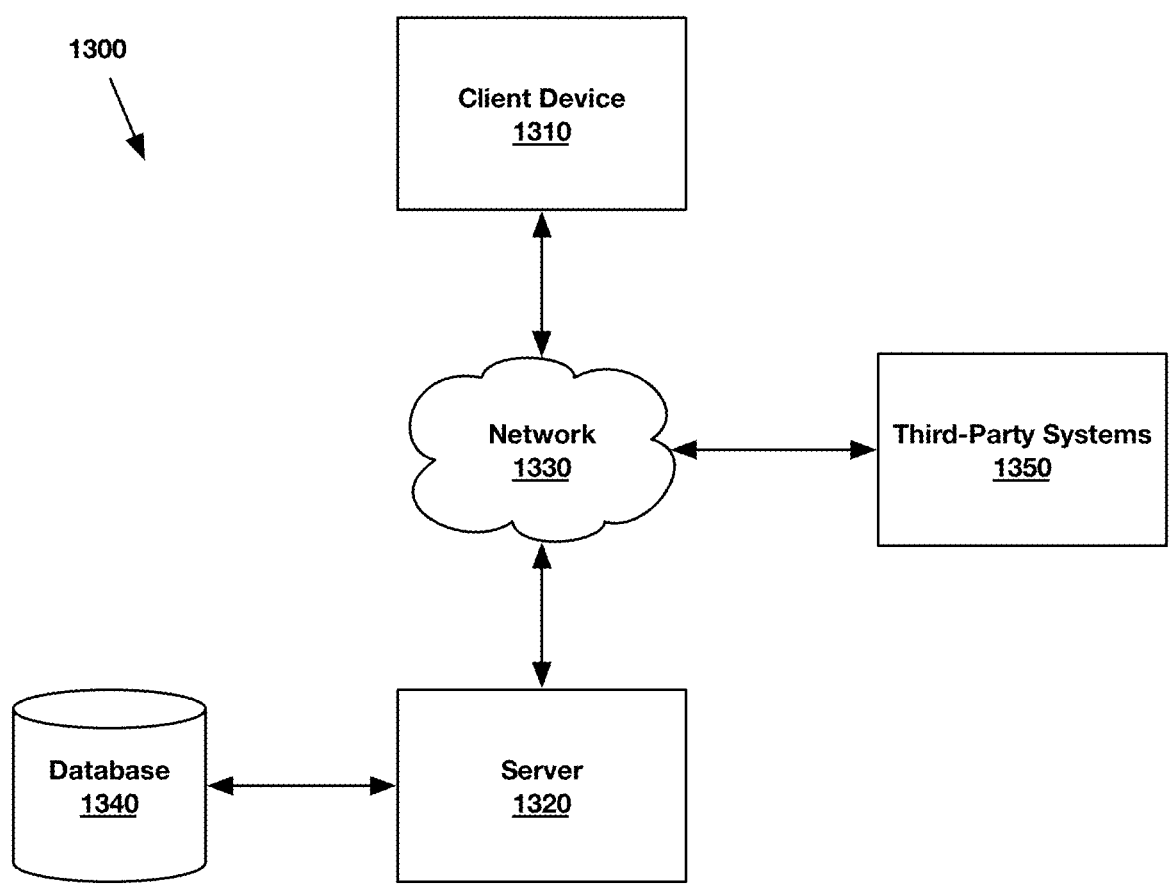
FIG. 13 shows an exemplary system 1300 according to an embodiment.

Referring to FIG. 13, a block diagram of an exemplary system 1300 according to an embodiment is illustrated. As shown, the system comprises any number of users accessing a server 1320 via a network 1330. In certain embodiments, a user may access the server 1320 via a client device 1310 connected to the network 1330.

Generally, a client device 1310 may be any device capable of running a client application and/or of accessing the server 1320 (e.g., via the client application or via a web browser). Exemplary client devices 1310 may include general purpose desktop computers, laptop computers, smartphones, and/or tablets.

The relationship of client 1310 and server 1320 arises by virtue of computer programs running on the respective computers and having a client-server relationship to each other. Accordingly, each of the client devices 1310 may have a client application running thereon, where the client application may be adapted to communicate with a server application running on a server 1320, for example, over a network 1330. Thus, the client application and server 1320 may be remote from each other. Such a configuration may allow users of client applications to input information and/or interact with the server from any location.

As discussed above, a client application may be adapted to present various user interfaces to users. Such user interfaces may be based on information stored on the client device 1310 and/or received from the server 1320. Accordingly, the client application may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code).

In certain embodiments, the server 1320 and/or the client device 1310 may be adapted to receive, determine, record and/or transmit application information. The application information may be received from and/or transmitted to the client application. Moreover, any of such application information may be stored in and/or retrieved from one or more local or remote databases (e.g., database 1340).

In one embodiment, the server 1320 may be connected to one or more third-party systems 1350 via the network 1330. Third-party systems 1350 may store information in one or more databases that may be accessed by the server. Exemplary third-party systems may include, but are not limited to: distributed ledger systems, cryptocurrency systems, payment and billing systems, messaging systems, cloud-based storage and backup systems, financial systems and others. The server 1320 may be capable of retrieving and/or storing information from third-party systems 1350, with or without user interaction. Moreover, the server may be capable of transmitting stored information to third-party systems.

Figure 14:
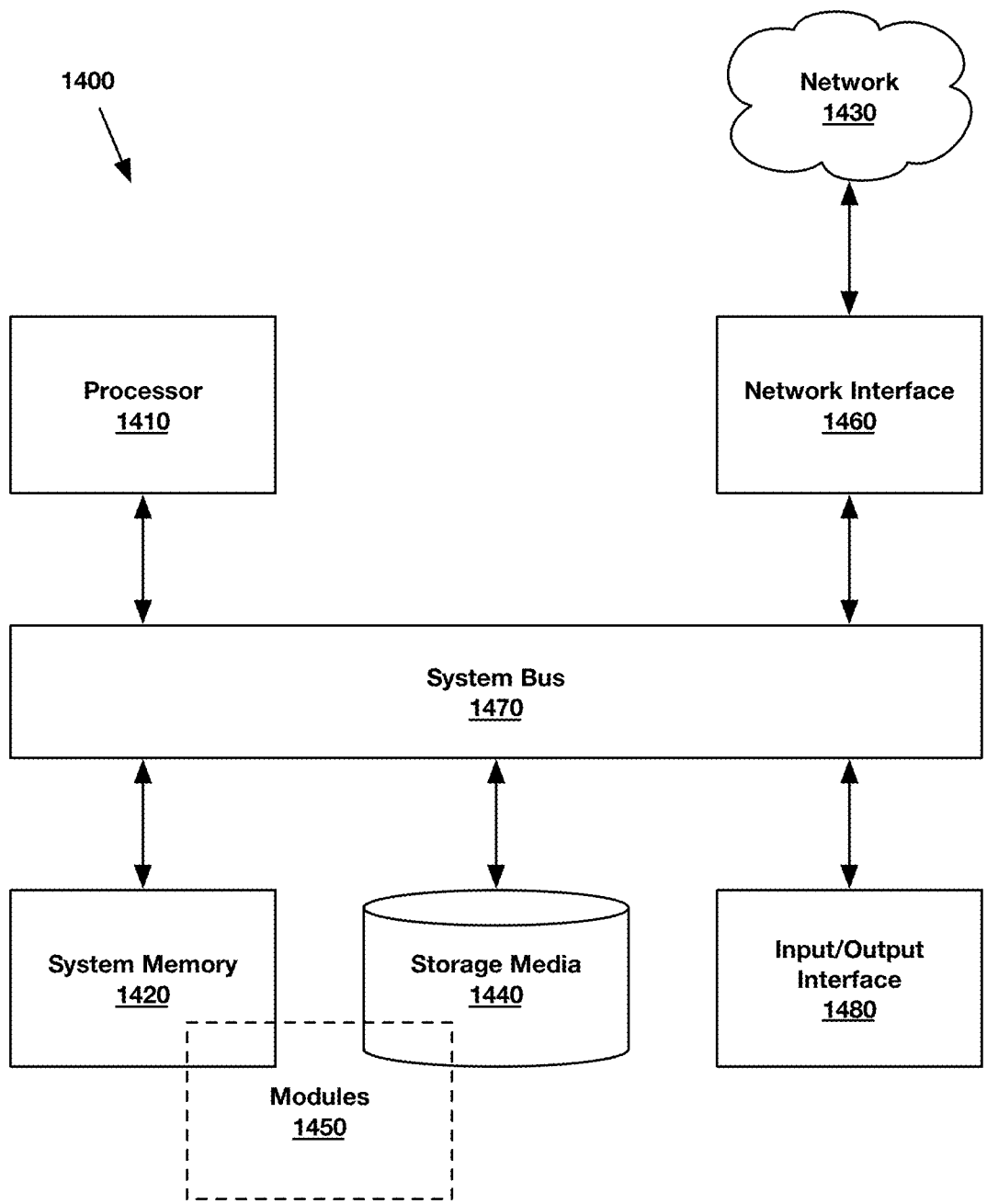
FIG. 14 shows an exemplary computing machine 1400 and modules 1450 according to an embodiment.

Referring to FIG. 14, a block diagram is provided illustrating a computing machine 1400 and modules 1450 in accordance with one or more embodiments presented herein. The computing machine 1400 may correspond to any of the various computers, servers, mobile devices, embedded systems, or computing systems presented herein (e.g., the client device(s) 1310, server(s) 1320, and/or third-party system(s) 1350 of FIG. 13). The modules 1450 may comprise one or more hardware or software elements configured to facilitate the computing machine 1400 in performing the various methods and processing functions presented herein.

The computing machine 1400 may comprise all kinds of apparatuses, devices, and machines for processing data, including but not limited to, a programmable processor, a computer, and/or multiple processors or computers. As shown, an exemplary computing machine 1400 may include various internal and/or attached components, such as a processor 1410, system bus 1470, system memory 1420, storage media 1440, input/output interface 1480, and network interface 1460 for communicating with a network 1430.

The computing machine 1400 may be implemented as a conventional computer system, an embedded controller, a laptop, a server, a mobile device, a smartphone, a kiosk, one more processors associated with a display, a customized machine, any other hardware platform and/or combinations thereof. Moreover, a computing machine may be embedded in another device, such as a smartphone, a tablet, a mobile audio or video player, a game console, or a portable storage device (e.g., a universal serial bus ("USB") flash drive). In some embodiments, the computing machine 1400 may be a distributed system configured to function using multiple computing machines interconnected via a data network or system bus 1470.

The processor 1410 may be configured to execute code or instructions to perform the operations and functionality described herein, manage request flow and address mappings, and to perform calculations and generate commands. The processor 1410 may be configured to monitor and control the operation of the components in the computing machine 1400. The processor 1410 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 1410 may be a single processing unit, multiple processing units, a single processing core, multiple processing cores, special purpose processing cores, coprocessors, or any combination thereof. In addition to hardware, exemplary apparatuses may comprise code that creates an execution environment for the computer program (e.g., code that constitutes one or more of: processor firmware, a protocol stack, a database management system, an operating system, and a combination thereof). According to certain embodiments, the processor 1410 and/or other components of the computing machine 1400 may be a virtualized computing machine executing within one or more other computing machines.

The system memory 1420 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 1420 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 1420 may be implemented using a single memory module or multiple memory modules. While the system memory is depicted as being part of the computing machine 1400, one skilled in the art will recognize that the system memory may be separate from the computing machine without departing from the scope of the subject technology. It should also be appreciated that the system memory may include, or operate in conjunction with, a non-volatile storage device such as the storage media 1440.

The storage media 1440 may include a hard disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 1440 may store one or more operating systems, application programs and program modules such as module, data, or any other information. The storage media may be part of, or connected to, the computing machine 1400. The storage media may also be part of one or more other computing machines that are in communication with the computing machine such as servers, database servers, cloud storage, network attached storage, and so forth.

The modules 1450 may comprise one or more hardware or software elements configured to facilitate the computing machine 1400 with performing the various methods and processing functions presented herein. The modules 1450 may include one or more sequences of instructions stored as software or firmware in association with the system memory 1420, the storage media 1440, or both. The storage media 1440 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the computing machine via the network, any signal-bearing medium, or any other communication or delivery technology. The modules 1450 may also comprise hardware circuits or information for configuring hardware circuits such as microcode or configuration information for an FPGA or other PLD.

The input/output ("I/O") interface 1480 may be configured to couple to one or more external devices, to receive data from the one or more external devices, and to send data to the one or more external devices. Such external devices along with the various internal devices may also be known as peripheral devices. The I/O interface 1480 may include both electrical and physical connections for operably coupling the various peripheral devices to the computing machine 1400 or the processor 1410. The I/O interface 1480 may be configured to communicate data, addresses, and control signals between the peripheral devices, the computing machine, or the processor. The I/O interface 1480 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attachment ("ATA"), serial ATA ("SATA"), universal serial bus ("USB"), Thunderbolt, Fire-Wire, various video buses, and the like. The I/O interface may be configured to implement only one interface or bus technology. Alternatively, the I/O interface may be configured to implement multiple interfaces or bus technologies. The I/O interface may be configured as part of, all of, or to operate in conjunction with, the system bus 1470. The I/O interface 1480 may include one or more buffers for buffering transmissions between one or more external devices, internal devices, the computing machine 1400, or the processor 1410.

The I/O interface 1480 may couple the computing machine 1400 to various input devices including mice, touch-screens, scanners, biometric readers, electronic digitizers, sensors, receivers, touchpads, trackballs, cameras, microphones, keyboards, any other pointing devices, or any combinations thereof. When coupled to the computing device, such input devices may receive input from a user in any form, including acoustic, speech, visual, or tactile input.

The I/O interface 1480 may couple the computing machine 1400 to various output devices such that feedback may be provided to a user via any form of sensory feedback (e.g., visual feedback, auditory feedback, or tactile feedback). For example, a computing device can interact with a user by sending documents to and receiving documents from a device that is used by the user (e.g., by sending web pages to a web browser on a user's client device in response to requests received from the web browser). Exemplary output devices may include, but are not limited to, displays, speakers, printers, tactile feedback devices, automation control, actuators, transmitters, signal emitters, lights, and so forth. And exemplary displays include, but are not limited to, one or more of: projectors, cathode ray tube ("CRT") monitors, liquid crystal displays ("LCD"), light-emitting diode ("LED") monitors and/or organic light-emitting diode ("OLED") monitors.

Embodiments of the subject matter described in this specification can be implemented in a computing machine 1400 that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network.

Accordingly, the computing machine 1400 may operate in a networked environment using logical connections through the network interface 1460 to one or more other systems or computing machines across the network 1430. The network 1430 may include wide area networks ("WAN"), local area networks ("LAN"), intranets, the Internet, wireless access networks, wired networks, mobile networks, telephone networks, optical networks, or combinations thereof. The network 1430 may be packet switched, circuit switched, of any topology, and may use any communication protocol. Communication links within the network 1430 may involve various digital or an analog communication media such as fiber optic cables, free-space optics, waveguides, electrical conductors, wireless links, antennas, radio-frequency communications, and so forth.

The processor 1410 may be connected to the other elements of the computing machine 1400 or the various peripherals discussed herein through the system bus 1470. It should be appreciated that the system bus 1470 may be within the processor, outside the processor, or both. According to some embodiments, any of the processor 1410, the other elements of the computing machine 1400, or the various peripherals discussed herein may be integrated into a single device such as a system on chip ("SOC"), system on package ("SOP"), or ASIC device.

Various embodiments are described in this specification, with reference to the detailed description above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method comprising:
   receiving, by a server in communication with a distributed ledger system via a network, loan information associated with a loan relating to a lender and a borrower, the loan information comprising:
   a total principal amount of the loan;
   a lender portfolio relating to the lender and associated with the distributed ledger system; and
   a borrower portfolio relating to the borrower and associated with the distributed ledger system;
   creating, by the server, a loan token for use with the distributed ledger system,
   wherein the loan token comprises a plurality of loan token units, and
   wherein the loan token is associated with loan token information comprising:
   the loan information;
   a unique ID; and
   a total number of the plurality of loan token units;
   transmitting, by the server, the loan token units to an escrow portfolio associated with the distributed ledger system,
   wherein the escrow portfolio is associated with required signers comprising: the borrower, the lender, a servicer and a validator;
   creating, by the server, a first distributed ledger transaction to cause the distributed ledger system to transfer the loan token units from the escrow portfolio to the lender portfolio, and
   wherein transferring the loan token units are transferred from the escrow portfolio to the lender portfolio, based on a determination that all of the required signers have signed the first distributed ledger transaction;
   receiving, by the server, payment information relating to a loan payment made by the borrower, the loan payment information comprising the unique ID and a principal payment amount;
   searching, by the server, the distributed ledger system, based on the unique ID, to determine one or more owner portfolios, each owning a portion of the total number of the loan token units;
   determining, by the server, for each of the owner portfolios, a percentage token ownership, based on the portion of the loan token units owned by the respective owner portfolio and the total number of the loan token units;
   determining, by the server, a disbursement amount for each of the owner portfolios, based on the principal payment amount and the respective percentage token ownership;
   creating, by the server, second distributed ledger transactions to cause the distributed ledger system to transfer the respective disbursement amount to each of the owner portfolios; and
   creating, by the server, third distributed ledger transactions to cause the distributed ledger system to transfer a number of the loan token units from each of the owner portfolios to the borrower portfolio, based on the respective disbursement amount transferred to each of the owner portfolios.

2. A method according to claim 1, wherein the plurality of required signers further comprises an originator.

3. A method according to claim 2, further comprising:
   upon said transferring the loan token units from the escrow portfolio to the lender portfolio, removing the originator from the plurality of required signers.

4. A method according to claim 1, wherein said transferring the loan token units from the escrow portfolio to the lender portfolio is further based on a determination that a payment has been received from the lender.

5. A method according to claim 1, further comprising:
   creating a servicing token for use with the distributed ledger system, the servicing token associated with the loan information and a unique ID; and
   transferring the servicing token to a servicer portfolio associated with the servicer and relating to the distributed ledger system.

6. A method according to claim 5, wherein the servicing token allows the servicer to service the loan and earn associated servicing fees.

7. A method according to claim 1, further comprising:
   determining that all of the loan token units have been transferred to the borrower portfolio;
   recording a termination of the loan in the distributed ledger system; and
   retiring the loan token.

8. A method according to claim 1, wherein the distributed ledger system comprises a blockchain system.

* * * * *